US010202500B2

(12) United States Patent
Nie

(10) Patent No.: US 10,202,500 B2
(45) Date of Patent: Feb. 12, 2019

(54) HEAVY METAL FREE CPVC COMPOUNDS

(71) Applicant: Lubrizol Advanced Materials, Inc., Cleveland, OH (US)

(72) Inventor: Li Nie, Broadview Heights, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 497 days.

(21) Appl. No.: 14/774,174

(22) PCT Filed: Mar. 12, 2014

(86) PCT No.: PCT/US2014/024179
§ 371 (c)(1),
(2) Date: Sep. 10, 2015

(87) PCT Pub. No.: WO2014/143623
PCT Pub. Date: Sep. 18, 2014

(65) Prior Publication Data
US 2016/0017123 A1 Jan. 21, 2016

Related U.S. Application Data

(60) Provisional application No. 61/789,886, filed on Mar. 15, 2013.

(51) Int. Cl.

| | | |
|---|---|---|
| *C08K 5/3462* | (2006.01) | |
| *C08K 3/34* | (2006.01) | |
| *C08K 3/14* | (2006.01) | |
| *F16L 9/12* | (2006.01) | |
| *C08K 5/00* | (2006.01) | |
| *C08K 5/098* | (2006.01) | |
| *F16L 9/127* | (2006.01) | |

(52) U.S. Cl.
CPC ............ *C08K 5/3462* (2013.01); *C08K 3/14* (2013.01); *C08K 3/34* (2013.01); *C08K 5/005* (2013.01); *C08K 5/098* (2013.01); *F16L 9/12* (2013.01); *F16L 9/127* (2013.01)

(58) Field of Classification Search
CPC .......... C08K 5/3462; C08K 3/34; C08K 3/14; F16L 9/12
USPC ....................................................... 524/112
See application file for complete search history.

(56) References Cited

U.S. PATENT DOCUMENTS

| | | | |
|---|---|---|---|
| 3,436,362 A | | 4/1969 | Hayer et al. |
| 6,096,280 A | | 8/2000 | Ellenor et al. |
| 6,096,820 A | † | 8/2000 | Lockledge |
| 7,741,390 B2 | † | 6/2010 | Wehner |
| 2004/0242908 A1 | | 12/2004 | Jennings et al. |
| 2008/0312363 A1 | † | 12/2008 | Fokken |
| 2009/0186989 A1 | * | 7/2009 | Berna ...................... C08K 3/16 525/366 |

FOREIGN PATENT DOCUMENTS

| | | |
|---|---|---|
| DE | 10132836 A1 | 1/2003 |
| DE | 102004037369 A1 | 3/2006 |
| EP | 0768336 A1 | 4/1997 |
| EP | 1044968 A1 | 10/2000 |
| EP | 1046668 A2 | 10/2000 |
| EP | 1426406 A1 | 6/2004 |
| EP | 2083044 | 7/2009 |
| EP | 2083044 A1 | 7/2009 |
| EP | 2392612 | 12/2011 |
| WO | WO 99/67332 * | 12/1999 |
| WO | 2002048249 A2 | 6/2002 |
| WO | 2004050754 A2 | 6/2004 |
| WO | 2008/023249 | 2/2008 |
| WO | 2008023249 A1 | 2/2008 |
| WO | 2012143794 A1 | 10/2012 |

OTHER PUBLICATIONS

European Patent Office, International Search Report for PCT/US14/24179, dated Jun. 26, 2014.
European Patent Office, Written Opinion of the International Search Authority for PCT/US14/24179, dated Jun. 26, 2014.
European Patent Office, International Preliminary Report on Patentability for PCT/US14/24179, dated Jun. 5, 2015.
Titow, W.V. , PVC Plastics—Properties, Processing and Applications, Textbook, 1990, Table 3.11 on p. 97, Elsevier Science Publishing Ltd.
The What's New Magazine—Popular Science, Sep. 2000, p. 38.

* cited by examiner
† cited by third party

*Primary Examiner* — Deve E Valdez
(74) *Attorney, Agent, or Firm* — Christopher P. Demas; Terean W. Gilbert

(57) ABSTRACT

The disclosed technology relates to chlorinated polyvinyl chloride (CPVC) compounds being free of heavy metals, particularly heavy metals in the form of stabilizer additives, the most common heavy metal being tin.

13 Claims, No Drawings

HEAVY METAL FREE CPVC COMPOUNDS

BACKGROUND OF THE INVENTION

The disclosed technology relates to chlorinated polyvinyl chloride (CPVC) compounds being free of heavy metals, particularly heavy metals in the form of stabilizer additives, the most common heavy metal being tin.

Halogen containing polymers tend to degrade or deteriorate when processed. Generally, the difference between the processing temperature and the degradation temperature is very small and there is a risk that the halogen containing polymers will therefore degrade. When such polymers degrade, it is believed that the halide acid generated by the polymer attacks the components of the processing equipment. Also, this acid further catalyzes elimination reactions and additional degradation of the polymer.

Stabilizers have been developed to help deter such degradation. For example, heavy metal compounds such as tin are commonly used as heat stabilizers. However, heavy metal stabilizers are becoming disfavored as heat stabilizers for halogenated polymers due to environmental concerns. As a potential replacement, organic based stabilizers (OB-Stabilizers) have been developed to stabilize halogen containing polymers. First generation OB-Stabilizers have been uracil based.

For example, EP1044968B1 to Chemtura Vinyl Additives teaches the use of uracil derivatives having the general formula I for the stabilization of chlorine-containing compounds.

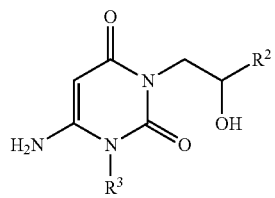

EP '968

The EP'968 patent teaches that zeolites can be employed in combination with the uracil derivatives of formula I in amounts of about 0.1 to 20 down to about 0.1 to 5 parts by weight, based on 100 parts by weight of the chlorine-containing polymer. The EP'968 patent also teaches that alkali and alkaline earth metal compounds, such as carboxylates, can be employed with the uracil derivative stabilizers. The preferred chlorine-containing polymer taught in the EP'968 patent is polyvinyl chloride (PVC). The patent does not teach or exemplify a formulation including CPVC.

U.S. Pat. No. 3,436,362, to Hayer et al., issued Apr. 1, 1969 teaches a stabilized polymer composition having between 0.1 and 10 parts by weight of stabilizer per 100 parts by weight of polymer. The stabilizer is uracil and its derivatives of general formula below and the polymer can be a halogenated vinyl compound, and specifically PVC.

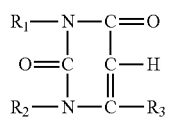

US '362

U.S. Pat. No. 4,656,209, to Wehner et al., issued Apr. 7, 1987 teaches a thermoplastic molding composition based on vinyl chloride polymers containing 0.1 to 5% by weight of an aminouracil of formula I. The patent further teaches that additional amounts of conventional PVC stabilizers may be employed, such as metal carboxylates. Zeolite is not mentioned and the patent does not teach or exemplify a formulation containing CPVC.

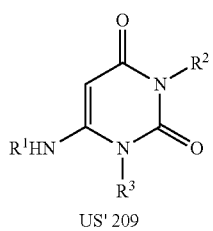

US' 209

U.S. Pat. No. 5,859,100, to Wehner et al., issued Jan. 12, 1999 teaches compositions including a rigid or semi-rigid PVC having a plasticizer content of up to 20%, and at least one aminouracil derivative compound of formula 1. Zeolites are expressly excluded and the patent does not teach or exemplify a formulation containing CPVC.

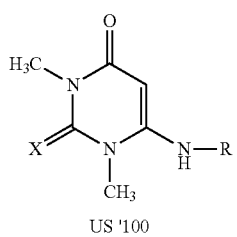

US '100

International application WO 2008/023249 to Chemfit Specialty Chemicals teaches a composition including an organic based stabilizer, such as uracil and its derivatives, and a smoke suppressant. Zeolites and carboxylates are disclosed as suitable smoke suppressants. The publication does not teach or exemplify a formulation containing CPVC.

The art above is directed more toward PVC type polymers than CPVC compositions. While zeolite and carboxylate may be suitable as co-stabilizers in the PVC stabilizer combinations taught, it would not be readily apparent that the same combinations would apply to CPVC compositions.

More specifically, where heat stabilizers protect the backbone of a halogenated polymer from degrading, acid scavenger co-stabilizers prevent the loss of halogen, such as chlorine, in the form of acids, such as HCl. PVC and CPVC resins are distinctly different polymers, most particularly in the level of chlorine present in the compositions. The higher level of chlorine in CPVC resins requires different handling than PVC. For example, the higher processing temperatures required to process CPVC also require a more robust stabilizer formulation to protect the CPVC. Thus, it is not directly obvious that what will work for processing PVC formulations will work for CPVC formulations.

It would be beneficial to the industry to prepare an inexpensive and readily available alternative to current stabilizer systems for CPVC resins.

SUMMARY OF THE INVENTION

It is not apparent from the prior art that a CPVC composition that is free of a heavy-metal stabilizer could be effectively stabilized by OB-stabilizers. The disclosed technology, therefore, solves the problem of providing a heavy metal free CPVC composition by including a stabilizer system consisting essentially of an OB-Stabilizer in combination with at least one of zeolite, $C_6$ to $C_{12}$ metal carboxylate, and combinations thereof.

In one aspect, the disclosed technology provides a stabilized chlorinated polyvinyl chloride (CPVC) composition. The stabilized CPVC composition can comprise (a) a CPVC resin, and (b) a stabilizer system.

In one embodiment, the stabilizer system can comprise, consist essentially of, or consist of 1) an organic based stabilizer, and 2) a co-stabilizer comprising at least one of zeolite, $C_6$ to $C_{12}$ metal carboxylate, and combinations thereof. In most embodiments, the stabilizer system consists of 1) an organic based stabilizer, and 2) a co-stabilizer comprising at least one of zeolite, $C_6$ to $C_{12}$ metal carboxylate, and combinations thereof.

In an embodiment, the stabilizer system can be present in the stabilized CPVC composition in an amount of from about 0.1 to about 6.0 parts by weight per 100 parts by weight of said CPVC resin.

In certain embodiment, the organic based stabilizer can be a uracil derivative, such as 6-amino-1,3-dimethyluracil, and can be present in an amount of from about 0.1 to about 2.0 parts by weight per 100 parts by weight of said CPVC resin.

In embodiments, the co-stabilizer can be present in an amount of from about 0.1 to about 5.0 parts by weight per 100 parts by weight of said CPVC resin. In many embodiments, the co-stabilizer can include at least one zeolite from about 0.1 to about 3.0 parts by weight per 100 parts by weight of said CPVC resin and/or the at least one $C_6$ to $C_{12}$ metal carboxylate, such as disodium sebacate, from about 0.1 to about 3.0 parts by weight per 100 parts by weight of said CPVC resin. Likewise, in many embodiments the weight ratio of zeolite to $C_6$ to $C_{12}$ metal carboxylate can be between about 6:1 to 1:6.

In another aspect of the invention, there is provided a pipe made from a CPVC composition according to any of the above embodiments.

The present invention also provides a method of stabilizing a CPVC polymer composition. The method includes employing in a CPVC composition a stabilizer system consisting essentially of 1) an organic based stabilizer, and 2) a co-stabilizer comprising at least one of zeolite, $C_6$ to $C_{12}$ metal carboxylate, and combinations thereof.

In an embodiment, the compositions and methods of the present technology exclude heavy metal stabilizers, such as tin stabilizers.

DETAILED DESCRIPTION OF THE INVENTION

Various preferred features and embodiments will be described below by way of non-limiting illustration.

One aspect of the invention is a rigid chlorinated polyvinyl chloride (CPVC) compound comprising (a) a CPVC resin, and (b) a stabilizer system.

In a preferred embodiment, the CPVC resin is rigid. Rigid CPVC in this specification can be defined according to ASTM D883. More specifically, a rigid polymer as used herein means a polymer having a either a flexural or tensile modulus of elasticity of 700 MPa (100,000 psi) or more measured at a temperature of 23° C. in an atmosphere of 50% relative humidity when tested in accordance with Test Methods ASTM D747, D790, D638, or D882.

CPVC resin, also referred to simply as CPVC, in general is comprised of a straight carbon chain backbone having hydrogen and chlorine covalently bonded and branching from individual carbon atoms along the backbone. Each carbon atom may contain from 0 to 2 chlorine atoms, as shown, for example, in formula I. Without being bound by theory, it is believed that the extent to which the carbon atoms are chlorinated can affect the properties of the CPVC, as well as any compound containing the CPVC or pipe extruded therefrom. For a typical pipe or fitting resin, CPVC according to the present invention can contain less than about 11.0 mole %, or from about 1.0 to about 10.0 mole %, or from about 3.0 to about 9.0 mole % of $CCl_2$. In general, lower amounts of $CCl_2$ are desirable for a CPVC resin. In another embodiment, CPVC according to the invention can contain from about 52.0 to about 66 mole %, or from about 54.0 to about 60.0 mole % CHCl.

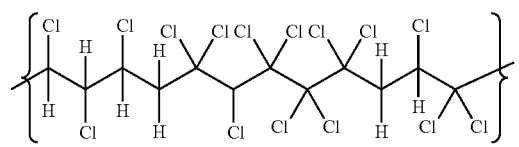

Formula I

It is further contemplated in the present invention that the CPVC resin can contain some unsaturation (i.e. double bonds) along the backbone. CPVC according to one aspect of the invention can contain from about 0.0 to about 4.0 mole %, or from about 1.0 to about 3.0 mole %. For example, for every 100 carbon bonds in the CPVC backbone, from average of about 0.0 or 1.0 to an average of about 4.0 of the bonds can be unsaturated.

In contrast to CPVC, PVC contains only about 50% $CH_2$ and about 50% CHCl moieties, with no $CCl_2$ moieties and very near 0% unsaturation. As such, PVC is a much more stable polymer intrinsically than CPVC.

CPVC can be prepared by chlorinating poly(vinyl chloride) (PVC) polymer. There are considerations pertaining to the precursor PVC from which are derived the post polymerization chlorination product (CPVC) employed in this invention. The molecular weight of PVC as indicated by inherent viscosity (I.V.) measurement per ASTM D1243 should generally range from about 0.4 to about 1.4 at the extremes. Desirably, the I.V. of precursor PVC employed falls within a range of from about 0.6 to about 1.4 for pipe and fittings, generally pipe is about 0.90 to about 1.05 and generally pipe fittings are about 0.6 to about 0.8. The preferred polymerization method for preparing said PVC is the aqueous suspension method. This is the predominant method used in the art. A detailed description of the suspension process is beyond the scope of the invention and therefore will not be disclosed. The suspension process for polymerization of PVC is described in *The Encyclopedia of PVC*, Marcel Decker, Inc. (1976).

CPVC suitable for use in the instant invention may be derived from a PVC copolymer having about 5 parts or less of a co-monomer. Where the precursor PVC contains less than about 5 parts total of one or more co-monomers per 100 parts of vinyl chloride, the chlorinated version of this polymer will also be referred to herein as CPVC.

Co-monomers can include esters of acrylic acid wherein the ester portion has from 1 to 12 carbon atoms, for example, methyl acrylate, ethyl acrylate, butyl acrylate, octyl acrylate, cyano-ethyl acrylate, and the like; vinyl acetate; esters of methacrylic acid wherein the ester portion has from 1 to 12 carbon atoms, such as methyl methacrylate (MMA), ethyl methacrylate, butyl methacrylate, and the like; acrylonitrile, and methacrylonitrile; styrene derivatives having a total of from 8 to 15 carbon atoms such as alpha-methylstyrene, vinyl toluene, chlorostyrene; vinyl naphthalene; diolefins having a total of from 4 to 8 carbon atoms such as isoprene, and including halogenated olefins such as chlorobutadiene, monoolefins such as ethylene and propylene and having from 2 to 10 carbon atoms, desirably 2 to 4 carbon atoms and preferably 4 carbon atoms, with isobutylene being highly preferred. If co-monomers are used, preferred are MMA, co-polymerizable imides such as N-cyclohexyl maleimide and co-monomers known to co-polymerize with vinyl chloride monomer and yield a copolymer having a Tg equal to or higher than homo-PVC. The preferred CPVC is derived from a PVC homopolymer. It is also contemplated that a small portion of the solvent in which the PVC is polymerized can copolymerize therewith. For example, vinyl chloride can advantageously be prepared in the presence of a chain modifying co-reactant solvents such as, for example, THF, an ethylenically unsaturated alkylene such as an alpha olefin or a reactive mercaptan such as 2-mercapto ethanol, and small portions thereof may be present as co-monomer in the resultant PVC.

CPVC resin is known to the art and to the literature and is commercially available. CPVC suitable for the CPVC compound disclosed herein can be made according to any commercial chlorination process or the like such as by a solution process, a fluidized bed process, a preferred water slurry process, a thermal process, or a liquid chlorine process. Reference is hereby made for example, to U.S. Pat. Nos. 2,996,049 and 3,100,762, with regard to suitable types of CPVC within the range of chlorine content which can be utilized, as well as to methods of preparation and the like.

In theory, CPVC employed herein may contain generally small amounts of non-chlorinated repeat units of vinyl chloride (VC) monomer. The amount of residual VC monomer repeat units can be from about 45.0 to about 62 wt %.

CPVC resin preferred in this specification includes CPVC having a specified weight percent (wt %) of chlorine from about 57.0 to about 70.0 wt %, more preferably, from about 60.0 to about 69.0 wt %, and even more preferably from about 63.0 to about 68.0 wt %, and most preferably between about 64.0 or 65.0 and 67.0 wt %. The wt % chlorine is based on the weight of the CPVC resin.

The CPVC resin can be included in a CPVC compound. A compound refers to a composition containing one or more resins and at least one further additives. Examples of suitable CPVC resins which can be used include the following TempRite™ CPVC resins: 674×571, 674×663 and 677×670, for example. TempRite™ is a registered trademark of Lubrizol Advanced Materials and the above enumerated resins are all commercially available from Lubrizol Advanced Materials in Cleveland, Ohio.

The stabilizer system of the CPVC compound of the first aspect of the invention can comprise, consist essentially of, or consist of 1) an organic based stabilizer, and 2) a co-stabilizer system. By "consist essentially of" it is meant that the compound may include some small amount of other stabilizer in amounts insignificant to the stabilization of the product, generally in the range of less than 1 phr, or less than 0.75 phr or less than 0.5 phr, or even less than 0.25 phr.

In simplest terms, organic based stabilizers (OB-Stabilizers) are nonmetal containing stabilizers based on organic chemistry. While the OB-Stabilizers suitable for the stabilizer system herein are not particularly limited, the most prevalent OB-Stabilizer compounds today include uracil and its derivatives. A common derivative of uracil suitable as an OB-Stabilizer for the composition herein is 6-amino-1,3-dimethyluracil. Other commercially available OB-Stabilizers suitable for the present composition include, for example, the Mark™ OBS™ line of stabilizers available from Galata™.

In general, the OB-Stabilizers can be included in the composition at levels required to meet physical properties, such as color. The OB-Stabilizers can be present in an amount of from about 0.05 or 0.1 to about 2.0 parts by weight per 100 parts by weight of said CPVC resin. In some embodiment, the OB-Stabilizers can be present from about 0.15 to about 1.75 phr, or from about 0.2 to about 1.5 phr, or even from about 0.25 or 0.5 to about 1.25 phr.

The co-stabilizer system can comprise, consist essentially of, or consist of at least one zeolite, at least one $C_6$ to $C_{12}$ metal carboxylate, or combinations thereof.

The co-stabilizer system can include an effective amount of at least one zeolite. Zeolites comprise basically a three dimensional framework of $SiO_4$ and $AlO_4$ tetrahedra. The tetrahedra are crosslinked through the sharing of oxygen atoms so that the ratio of oxygen atoms to the total of the aluminum and silicon atoms is equal to 2. This relationship is expressed as $O/(Al+Si)=2$. The electrovalence of the tetrahedra containing aluminum and silicon is balanced in the crystal by the inclusion of a cation. For example, the cation can be an alkali or alkaline earth metal ion. The cation can be exchanged for another depending upon the final usage of the aluminosilicate zeolite. The spaces between the tetrahedra of the aluminosilicate zeolite are usually occupied by water. Zeolites can be either natural or synthetic.

The basic formula for all aluminosilicate zeolites is represented as follows:

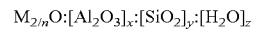

$$M_{2/n}O:[Al_2O_3]_x:[SiO_2]_y:[H_2O]_z$$

wherein M represents a metal, n represents the valence of the metal and X and Y and Z vary for each particular aluminosilicate zeolite. Essentially it is believed that any aluminosilicate zeolite can be used as a stabilizer in the instant invention, provided that the ratio of the silicon to aluminum in such aluminosilicate zeolite is less than 3.0 and that the aluminosilicate zeolite can be incorporated into the CPVC compound. Preferably, the zeolite ratio of silicon to aluminum in such aluminosilicate zeolite is less than 1.5. Most preferably, the ratio of silicon to aluminum in such aluminosilicate zeolite is about 1.

Example zeolites which can be used in the instant invention include but are not limited to zeolite A, described in U.S. Pat. No. 2,822,243; zeolite X, described in U.S. Pat. No. 2,822,244; zeolite Y, described in U.S. Pat. No. 3,130,007; zeolite L, described in Belgian Pat. No. 575,117 zeolite F, described in U.S. Pat. No. 2,996,358; zeolite B, described in U.S. Pat. No. 3,008,803; zeolite M, described in U.S. Pat. No. 2,995,423; zeolite H, described in U.S. Pat. No. 3,010,789; zeolite J, described in U.S. Pat. No. 3,011,869; zeolite P, described in U.S. Pat. No. 3,532,459, and zeolite W, described in U.S. Pat. No. 3,102,853.

The preferred zeolites can include, alone or in combination with another Group I metal, hydrated silicates of aluminum incorporating sodium, of the type $mNa_2O.xAl_2O_3.ySiO_2.zH_2O$. These preferred zeolites include zeolites A, P, X, and Y.

In the prior art, it is preferable to include the zeolite at sub-micron particle sizes (e.g., D50 by volume of less than 1 micron) and a water content of less than 10 weight percent to avoid moisture issues in the compound, such as foaming. However, it has been found that the at least one zeolite can be employed at any particle size distribution, particle size, and water content as a sole stabilizer, or in combination with a $C_6$ to $C_{12}$ metal carboxylate and OB-Stabilizer.

As a sole stabilizer, the zeolite can generally be present at from about 0.1 to about 4.0 phr. The abbreviation "phr" is used in this specification to express the amount of an additive component by weight based on 100 parts by weight of the CPVC resin. In some embodiments, the zeolite can be present from about 0.25 to about 3.5 phr, or 0.5 to about 3.0 phr. In a preferred embodiment, the zeolite can be present from about 0.75 to about 1.5 or 2.5 phr.

The co-stabilizer system can also include a metal carboxylate. The $C_6$ to $C_{12}$ metal carboxylate can be a metal salt of a saturated $C_6$, or $C_7$, or $C_8$ to $C_H$, or $C_{12}$ aliphatic carboxylate or di-carboxylate, an unsaturated $C_6$ to $C_{12}$ aliphatic carboxylate or di-carboxylate, a saturated $C_6$ to $C_{12}$ aliphatic carboxylate or di-carboxylate substituted with at least one OH group, or whose chain is interrupted by at least one oxygen atom (oxyacids), or a cyclic or bicyclic carboxylate or di-carboxylate containing from 6, or 7, or 8 to 11 or 12 carbon atoms. Suitable metals for the metal carboxylate can include Li, K, Mg, Ca, and Na.

Preferably the $C_6$, or $C_7$ or $C_8$ to $C_{11}$ or $C_{12}$ metal carboxylate is a sodium carboxylate, most preferably a disodium carboxylate, such as disodium sebacate, disodium dodecanedioate or disodium suberate, and combinations thereof. Other examples of $C_6$ to $C_{12}$ metal carboxylates that may be employed include disodium adipate, disodium azelate, and disodium undecanedioate.

The $C_6$ to $C_{12}$ metal carboxylate can be present from about 0.1 to about 4.0 phr. In some embodiments, the $C_6$ to $C_{12}$ metal carboxylate can be present from about 0.25 to about 3.0 phr, or 0.5 to about 2.5 phr. In a preferred embodiment, the $C_6$ to $C_{12}$ metal carboxylate can be present from about 1.0 to about 2.0 phr. The metal carboxylate can be dry blended with other ingredients of a compound or the CPVC resin can be coated with a metal carboxylate solution by a wet coating process followed by drying to obtain a metal carboxylate coated CPVC resin.

When in combination, the zeolite and $C_6$ to $C_{12}$ metal carboxylate can be present at levels that do not negatively affect the ability of the CPVC compound to meet physical property limitations and that avoid moisture foaming. With respect to moisture foaming, it has been found that including zeolite in combination with the $C_6$ to $C_{12}$ metal carboxylate at specified ratios diminishes the propensity of the zeolite to cause moisture foaming. In one embodiment the weight ratio of zeolite to the $C_6$ to $C_{12}$ metal carboxylate can be between about 6:1 to 1:6. In another embodiment, the weight ratio of zeolite to $C_6$ to $C_{12}$ metal carboxylate can be from about 5:1 to 1:5, or 4:1 to 1:4, or even 3:1 to 1:3. In some preferred embodiments the weight ratio of zeolite to $C_6$ to $C_{12}$ metal carboxylate can be from about 2:1 to 1:2, or even 1:1.

When employing a combination of zeolite and $C_6$ to $C_{12}$ metal carboxylate, the co-stabilizer system can be present at levels that do not negatively affect the ability of the CPVC compound to meet physical property limitations and that avoid moisture foaming. Generally, the co-stabilizer combined system can be present from about 0.1 to about 7.0 phr, more preferably 0.5 to about 6.0 phr, or 0.75 to about 5.0 phr. In some embodiments, the combined co-stabilizer system can be present from about 1.0 to about 4.0 phr, and more preferably 1.25 to about 3.0 phr.

In one embodiment, other co-stabilizers beside zeolite and carboxylate may also be employed in the co-stabilizer system. In an embodiment, the stabilizer system is essentially free of, or free of heavy metal stabilizers, such as tin stabilizers. By essentially free of it is meant that a minor portion may be present in amounts that do not contribute or contribute an insignificant amount to stabilization.

For most purposes, the stabilizer system including both the OB-Stabilizers and the co-stabilizer system can be present in amount of from about 0.1 to about 7.0 or 8.0 phr. Preferably, the stabilizer system of the combination can be present at about 0.5 to about 6, or from about 0.75 to about 5.0. In some embodiments, the stabilizer system including both zeolite and $C_6$ to $C_{12}$ metal carboxylate can be present in amount of from about 1.0 to about 4.5, or even 1.25 to about 3.0 or 4.0 phr.

In another aspect, the invention includes a method of stabilizing a CPVC composition. The method comprises the step of employing in the CPVC composition a stabilizer system comprising, consisting essentially of, or consisting of an OB-Stabilizer and a co-stabilizer system comprising, consisting essentially of, or consisting of at least one of zeolite, $C_6$ to $C_{12}$ metal carboxylate, and combinations thereof.

In addition to the CPVC resin and stabilizer system, other ingredients typically added to CPVC compounds can be included in the compounds of the instant invention. The amount and nature of these ingredients is dependent upon the end use of the CPVC compound. The ingredients and their amount can be tailored to meet the end-use needs by one of ordinary skill in the art.

Chlorinated polyethylene (CPE) can also be added to the CPVC compound. The CPE is a rubbery material resulting from the chlorination of polyethylene having a substantially linear structure. The polyethylene can be chlorinated by various methods including aqueous suspension, solution or gas phase methods. An example of a method for preparing CPE can be found in U.S. Pat. No. 3,563,974. Preferably, the aqueous suspension method is used to form the CPE. If used as an impact modifier, the CPE material contains from 5 to 50% by weight of chlorine. Preferably, the CPE contains from 25 to 45% by weight of chlorine. However, the CPE can comprise a mixture of chlorinated polyethylenes, provided that the overall mixture has a chlorine content in the range of about 25 to 45% by weight chlorine. CPE is commercially available from The DuPont Dow Elastomer Company. The preferred CPE materials to be used in the compound include Tyrin™ 3611P, 2000 and 3615P; all available from the DuPont Dow Elastomer Company. Tyrin is a trademark of the DuPont Dow Elastomer Company.

The CPVC compounds may also include acrylic impact modifiers. U.S. Pat. No. 3,678,133 describes the compositions conventionally referred to as acrylic impact modifiers. Generally, the acrylic impact modifier is a composite interpolymer comprising a multi-phase acrylic base material comprising a first elastomeric phase polymerized from a monomer mix comprising at least 50 wt. % alkyl methacrylate having 1-4 carbon atoms in the alkyl group and having a molecular weight of from 50,000 to 600,000. Further, the patent states that the polymerization of the rigid thermoplastic phase is preferably conducted in such a fashion that substantially all of the rigid phase material is formed on or near the surface of the elastomeric phase. Acrylic impact modifiers are polyacrylates including ($C_4$-$C_{12}$) acrylate homo or copolymers, second stage graft copolymerized with methyl methacrylate and styrene, poly(ethylhexyl acrylate-co-butyl-acrylate) graft copolymerized with styrene, and/or acrylonitrile and/or methyl methacrylate; polybutyl acrylate graft polymerized with acrylonitrile and styrene. Examples of suitable acrylic impact modifiers include Paraloid™ EXL-2330, KM™ 330, 334, and 365; all of which are available from Rohm and Haas. Paraloid is a trademark of the Rohm & Haas Company. Additionally Durastrength™ 200, available from Elf Atochem, and Kane Ace™ FM-10 and FM-25, available from Kaneka, are examples of commercially available acrylic impact modifiers.

Methyl butadiene styrene ("MBS") impact modifiers can also be added to the compounds of the present invention. MBS polymers are graft polymers. Generally, MBS impact modifiers are prepared by polymerizing methyl methacrylate or mixtures of methyl methacrylate with other monomers in the presence of polybutadiene or polybutadiene-styrene rubbers. Further information on MBS impact modifiers can be found in the Second Edition of the Encyclopedia of PVC, edited by Leonard I. Nass, Marcel Dekker, Inc. (N.Y. 1988, pp. 448-452). Examples of commercially available MBS impact modifiers include Paraloid KM™ 680, BTA™ 733, 751, and 753 available from Rohm & Haas, Kane Ace™ B-22 impact modifier and Kane Ace™ B-56 impact modifier available from Kaneka.

Typical of the graft copolymer impact modifiers are those generally referred to as "ABS" resins, which may generally be described as copolymers of styrene and acrylonitrile on butadiene containing rubber. ABS modifiers are usually prepared by polymerizing styrene and acrylonitrile in the presence of polybutadiene rubber. Examples of commercially available ABS impact modifiers which can be used in the instant invention include Blendex 338, Blendex 310 and Blendex 311; all available from GE Plastics. If used as the impact modifier of choice, approximately 5 parts to about 15 parts of ABS impact modifier are used. Preferably, 6 parts of the ABS impact modifier are used.

Other additives can also be added to the CPVC compounds as needed. Conventional additives known in the art as well any other additives may be used, provided that the additive does not alter the physical properties and the process stability associated with the novel compounds. Examples of additives which can be used include antioxidants, lubricants, other stabilizers, other impact modifiers, pigments, glass transition enhancing additives, processing aids, fusion aids, fillers, fibrous reinforcing agents and antistatic agents.

Exemplary lubricants are polyglycerols of di- and tri-oleates, polyolefins such as polyethylene, polypropylene and oxidized polyolefins such as oxidized polyethylene and high molecular weight paraffin waxes. Since several lubricants can be combined in countless variations, the total amount of lubricant can vary from application to application. Optimization of the particular lubricant composition is not within the scope of the present invention and can be determined easily by one of ordinary skill in the art. Preferably, an oxidized polyethylene is used. An example of an oxidized polyethylene is AC 629A, sold by Allied Signal. In addition to the oxidized polyethylene, preferably a paraffin wax may also be included in the compounds of the instant invention. An example of a paraffin wax is Paraffin 160F Prill from Witco.

Suitable processing aids include acrylic polymers such as methyl acrylate copolymers. Examples of process aids include Paraloid K-120ND, K-120N, K-175; all available from Rohm & Haas. A description of other types of processing aids which can be used in the compound can be found in The Plastics and Rubber Institute: International Conference on PVC Processing, Apr. 26-28 (1983), Paper No. 17.

An example of antioxidants to be used in the halogen containing compounds include Irganox 1010 (tetrakis [methylene(3,5-di-tert-butyl-4-hydroxyhydrocinnamate)] methane) sold by Ciba, if used at all.

Suitable pigments include among others titanium dioxide, and carbon black. Examples of titanium dioxide is Tiona RCL-6 and RCL-4 from Millenium Inorganics. An example of carbon black is Raven 410, available from Columbian Chemicals.

Suitable inorganic fillers include talc, clay, mica, wollastonite, silicas, and other filling agents.

The components of the unique compound can be made in any manner wherein the various components are added together and mixed under heat. For example, the appropriate amount of the CPVC resin can be added to a vessel such as Henschel mixer or a ribbon blender. The remaining ingredients of the compound can then be added thereto and mixed until the blend is homogeneous. If pellets are to be formed, the compound can be melt mixed. Melt mixing can generally occur in the temperature range of about 150 to about 250° C. Once the blend is formed, it can be processed further depending upon the desired application in any conventional manner, using extrusion or molding techniques.

If extrusion techniques are used to process the composition of the present invention, generally conventional extrusion machinery such as a multiscrew extruder or a single screw extruder are used. An extruder generally has conveying means, an intermediate screw processing means and a final die through which the material is discharged in the form of an extrudate. Generally, a multi-screw extruder is used for the extrusion of pipe. Examples of possible conventional extruders to be used to process the CPVC and PVC compounds containing the modified zeolite include the following twin screw counterrotating extruder models from Cincinnati Milacron: CM 35HP, CM 55HP, CM 65HP, CM 80HP, CM 92HP. Examples of suitable conical twin screw extruders from Krauss Maffei include KMD-2/40KK and KMD-2/50KK.

The CPVC compound made according to the instant invention has the following characteristics: a tensile strength in the range of about 5,000 to about 10,000 psi (as measured according to ASTM D 638-95); a Notched Izod in the range of about 1.0 to about 20 ft·lb. per inch of notch (as measured according to ASTM D 256-93A); a dynamic thermal stability of greater than 14 minutes, such as, for example, in the range of about 14 to about 60 minutes as measured by ASTM D 2538), unless otherwise specified:
1) Counter rotating batch mixing bowl is set at 190-205° C. depending on formulations, 75 grams sample is charged to the batch mixer unless otherwise specified;
2) 1 minute sample loading at 10 rpm, followed by 2 minutes gentle mixing at 1 rpm, followed by 35 rpm run until sample degrades. Stability timing starts at 35 rpm;
3) A small pinch sample is taken at 7 minutes after 35 rpm is achieved, and then every minute thereafter.

a heat distortion temperature in the range of about 80 to about 140° C. (as measured by ASTM D 648-95). This novel compound can be formed into any article desired. Examples include but are not limited to sheet, pipe, ducts, fittings, valves, injection molded and thermoformed industrial parts, appliance housing, fabricated parts, and different containers.

In a preferred embodiment, the CPVC compound can be employed to prepare pipe.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

The invention herein is useful for preparing stable CPVC compounds and particularly CPVC compounds that can be extruded into pipe, which may be better understood with reference to the following examples.

EXAMPLES

Sample Preparation Procedure

Resin

CPVC resin is prepared in a pilot plant for specific IV and chlorine content. For stabilizers that are water soluble, the resin is wet coated and dried. Wet resin is dried in a flat tray at room temperature for two days inside a natural vent hood to be free of free moisture.

Stabilizers

Some of the carboxylate stabilizers evaluated are available in acid form purchased from Sigma-Aldrich (unless otherwise specified). In such cases, the acid is neutralized with 20% NaOH solution to a pH of 7.5-8.0 and fully dissolved in water to form a salt solution. In some cases, for example, with higher carbon length carboxylates, such as sebacate and dodecanedioate, the salt solution is raised to about 60-80° C. to make sure the neutralized sodium carboxylates are soluble before being added to the resin for blend mixing. 15 phr by weight of the salt solution per 100 phr resin is mixed in a blender to make sure the resin is fully mixed with the solution at the desired stabilizer phr level.

Other of the stabilizers are available as powder. All powder ingredients are mixed together using a ware blender.

DTS Measurement

The Dynamic Thermal Stability (DTS) is measured according to ASTM D 2538. A longer DTS time is indicative of a compound with enhanced stability.

The Brabender™ DTS batch mixer is used to study melt stability. One way to determine stability time is by analyzing where the DTS curve increases by 100 mg, combined with visual inspection of the melt appearance, indicates degradation time. At the point of melt degradation, the melt color typically will show a very visible darkened color. Monitoring color change is also a good way to study melt stability by pinching out a small melt chip for the color record at selected time intervals. Higher DTS stability is preferred.

The DTS procedure used herein is as follows, unless otherwise specified:

1) Counter rotating batch mixing bowl is set at 190-205° C. depending on formulations, 75 grams sample is charged to the batch mixer unless otherwise specified 2) 1 minute sample loading at 10 rpm, followed by 2 minutes gentle mixing at 1 rpm, followed by 35 rpm run until sample degrades. Stability timing starts at 35 rpm;

3) A small pinch sample is taken at 7 minutes after 35 rpm is achieved, and then every minute thereafter.

4).

Example 1

Tan Color Hold Stability Using DTS Sample Pinching Method

Table 1 below shows formulations containing various amounts of acid scavenging stabilizers and 0.75 phr of an OB-Stabilizer 6-amino-1,3-dimethyluracil, blended together in a compound with a 0.92 IV CPVC resin having 66.25 wt % chlorine, along with 13.45 phr of a masterbatch of further additives made from 7.0 phr MBS impact modifier, 0.25 phr Antioxidant, 4.0 phr $TiO_2$, and 1.05 phr Fisher Tropsch wax lubricant, 1.15 phr oxidized polyethylene wax lubricant. Representation of $NaC_{6-12}$ at more than 100 parts indicates that the CPVC resin is wet coated with the $NaC_{6-12}$ carboxylate. Otherwise, the carboxylate is added to the formulations as a powder blend. The control compound, 3107-309 (available from Lubrizol Advanced Materials®) contains a tin stabilizer.

Table 1 also provides the color stability time. The formulations presented above are tested for color hold stability in a tan colored compound.

Color hold stability is another measure of melt stability. A small sample of the compound is taken using a sampling plier during DTS melt mixing. The color samples are measured using a GretagMacbeth Color i7 color measuring device, for L, a, b, YI and DeltaE, and a white color sample, GretagMacbeth NetProfiler STQ1391 White, is used as a reference.

Color readings to determine stability time need to use color chip samples as a reference to determine a best reading number from all of the optical data. For tan samples, the best index to use is the lightness index (L, white control used as reference). Such a reading is more accurate than relying on visual observations as it can be difficult for the eye to detect the difference when there is a relatively smooth color shift. Stability time is called, or set, based on the reading from the "lightness" index (L). Melt stability is determined when the L measurement stays at around 79-80.

The time to reach an L measurement of around 79 to 80 is provided as the stability time. The color pinching method in general has an experimental error of about 0.5-1.0 minute on stability time.

TABLE 1

| Sample | Co-Stabilizer | Co-Stabilizer amount (phr) | Color Stability Time (min) |
|---|---|---|---|
| 1 | 3107-309 control | | 10 |
| 2 | Zeolite A | 1.5 | 7 |
| 3 | Zeolite A | 2 | 12 |
| 4 | Zeolite A | 2.5 | 14 |
| 5 | Zeolite P | 2.5 | 8 |
| 6 | $NaC_6$ | 102.5 | 8 |
| 7 | $NaC_8$ | 102.5 | 8 |
| 8 | $NaC_9$ | 102.5 | 10 |
| 9 | $NaC_{10}$ | 102.5 | 8 |
| 10 | $NaC_{12}$ | 102.5 | 8 |
| 11 | $NaC_6$/Zeolite A | 101.25/1.25 | 11 |
| 12 | $NaC_8$/Zeolite A | 101.25/1.25 | 11 |
| 13 | $NaC_9$/Zeolite A | 101.25/1.25 | 9 |
| 14 | $NaC_{10}$/Zeolite A | 101.25/1.25 | 14 |
| 15 | $NaC_{12}$/Zeolite A | 101.25/1.25 | 11 |

Combining type A zeolite with disodium carboxylates showed a good synergy effect overall on melt stability, all can meet stability target in reference to a commercial control. In particularly, disodium sebacate in combination with type A zeolite performed significantly better than the rest of combination and exhibited strong synergy. All of this are not fully anticipated or expected out of the combination of zeolite with sodium carboxylates. Such combinations can help address moisture problems that can arise with zeolite alone.

Example 2

Tests are completed to determine the effect of OB-Stabilizer (6-amino-1,3-dimethyluracil) concentration on color hold stability. The compounds include a 0.92 IV CPVC resin having 66.25 wt % chlorine, along with 13.45 phr of a masterbatch of further additives made from 7.0 phr MBS impact modifier, 0.25 phr Antioxidant, 4.0 phr $TiO_2$, and 1.05 phr Fisher Tropsch wax lubricant, 1.15 phr oxidized polyethylene wax lubricant.

TABLE 2

| Sample | Co-Stabilizer | Co-Stabilizer Amount | OB-Stabilizer | Color Stability time (min) |
|---|---|---|---|---|
| 1 | 3107-309 Control | | | 11 |
| 16 | $NaC_{10}^3$/Zeolite A | 101.0/1.0 | 0.25 | 11 |
| 17 | $NaC_{10}^3$/Zeolite A | 101.0/1.0 | 0.5 | 10 |
| 18 | $NaC_{10}^3$/Zeolite A | 101.0/1.0 | 1.1 | 11 |
| 19 | $NaC_{10}$/Zeolite A | 1.0/1.0 | 0.5 | 10 |

[3]Sample is made of a blend of 81 parts of 1.25 disodium sebacate coated CPVC with 20 parts of CPVC to obtain 1.0 phr total coated disodium sebacate CPVC.

Table 2 shows that OB-Stabilizer can be employed at varying levels in sole combination with zeolite and metal carboxylates to provide effective color stability.

Example 3

Pipe Formulations

¾" copper tube size (CTS) standard dimension ratio (SDR) 11 pipes are made free of moisture foaming problem using a conical counter-rotating twin screw extruder TC-55. Barrel temperatures are set at: 370° F., die temperature set at 380-415° F. Screw oil at 340-365° F. Screw is run at 21-22 rpm. Feeds are run at 230-260 lbs/hr. The formulations are provided in Table 3.

Pipes made of above formulations meet cell class of 23447. The formulation can also be adjusted to meet 23448 cell class rating by increasing chlorine content in CPVC resin. Long term hydrodynamic hoop stress test at 180° F. is tracking well meeting intended design pressure rating of at least 100 psi hydraulic pressure.

| | 20 | 21 |
|---|---|---|
| 66.25Cl % CPVC (0.92IV) | | 100 |
| $NaC_{10}$[4] | 101.25 | |
| Zeolite A | 0.5 | 0.75 |
| $NaC_{10}$ | | 1.25 |
| Mark™ OBS™ 702 OB-Stabilizer from Galata Chemicals | 1.25 | 1.25 |
| Antioxidant | 0.25 | 0.25 |
| MBS impact modifier | 6.75 | 6.75 |
| $TiO_2$ | 4.0 | 4.0 |
| Fisher Tropsch wax Lubricant | 0.9 | 0.9 |
| Oxidized polyethylene wax lubricant | 1.0 | 1.0 |
| Polyethylene wax lubricant | 0.25 | 0.25 |
| Irgazin Yellow | 0.015 | 0.015 |
| Physical properties | | |
| Tensile strength at yield (psi) | 7300 | 7381 |
| Tensile Modulus(kpsi) | 379 | 381 |
| Notch Izod (ft-lbs/in) | 2.6 | 2.4 |
| Drop dart impact (ft-lbs) | 24 | 20.4 |
| Vise crush (60%, 100%) | pass, pass | pass, pass |
| HDT (° C., annealed at 100° C.) | 107.5 | 110.5 |

[4] 1.25 phr disodium sebacate coated CPVC resin (0.92IV 65.25Cl %) made in pilot plant. Disodium sebacate solution targeted for 1.25 phr coating is metered and mixed in the auger with wet CPVC resin coming out of centrifuge and dried using a fluidized bed dryer.

Example 4

Fitting Formulations

Fitting formulations are provided for injection molding in table 6. Formulations 22-24 are melt processed on a mill system at 400° F. and cubed into pellets. The pellets are dried in a desiccant dryer at 190° F. for 4 hours before being molded using a Vandorn HT-85 injection molding machine. Specimens for physical property measurement are injection molded with satisfaction for finishing and color. These molded products can meet cell class 23447.

| | run ID | | |
|---|---|---|---|
| Raw material | 22 | 23 | 24 |
| 66.25CL % CPVC(0.68 IV) | 100 | | |
| 65.25Cl % CPVC (0.68IV) | | 100 | |
| 64.5Cl % CPVC (0.68IV) | | | 100 |
| Zeolite A | | 1.25 | |
| 0.7 µmD90 Zeolite A[7] | 1.5 | | 1.5 |
| Disodium sebacate | 1.0 | 1.25 | 1.0 |
| Mark™ OBS™ 702 OB-Stabilizer from Galata Chemicals | 1.25 | 1.25 | 1.25 |
| MBS impact modifier | 7.5 | 8.0 | 7.75 |
| Antioxidant | 0.3 | 0.3 | 0.25 |
| $TiO_2$ | 3.5 | 3.5 | 3.5 |
| Fisher Tropsch wax Lubricant | 1.05 | 1.05 | 1.1 |
| Oxidized polyethylene wax lubricant | 1.2 | 1.2 | 1.2 |
| Physical properties | | | |
| Notched Izod (ft-lb/in) | 1.4 | 2.0 | 2.5 |
| Heat distortion Temperature (° C.) Annealed at 97° C. | 108.5 | 106 | 101.5 |
| Melt Flow Index ("MFI") (215° C., 21.6 kgs) | 6.6 | | 10.1 |

[7]0.7 µmD90 zeolite A: 07 µm D50 average zeolite is made by a Eiger wet milling Zeolite A using a Labstar LS1 wet mill from Netzsch. The wet milled sample (water slurry without any other additives) at 25% solids is spray dried using a pilot scale spray dryer. Milling beads are 0.3 mm Zirmil-Y from Dynamic Media.

Example 5

Pipe Extrusion Formulations for CTS ¾" SDR 11 Pipe

Pipes are made using a conical counter-rotating twin screw extruder TC-55. The barrel temperatures are set at 360-370° F., and the die temperatures are set at 380-420° F. The screw oil was at 365° F. and the screws were run as 22 rpm with feeds at 250 lbs/hr. Pipes made of the above formulations meet cell class of 23447 and 24448 and had no moisture problems.

| PARTS | 25 | 26 | 27 | 28 | 29 | 30 | 31 |
|---|---|---|---|---|---|---|---|
| 0.92IV 66.25Cl % CPVC | 100 | 100 | 100 | | 100 | 100 | |
| 0.92IV 65.25Cl % CPVC | | | | 100 | | | |
| 0.92IV 1.2 phr NaC10CPVC (66.25Cl %) | | | | | | | 101.2 |
| Ester based lubricant | | | | | 0.5 | | |
| Antioxidant | 0.25 | 0.25 | 0.25 | 0.25 | 0.25 | 0.25 | 0.25 |
| MBS impact modifier | 7 | 7 | 7 | 7 | 7 | 7.5 | 7 |
| Fischer-Tropsch wax lubricant | 1.25 | 1.7 | 1.7 | 1.7 | 1.7 | 1.7 | 1.7 |
| Polyethylene wax lubricant | 0.5 | | | | | | |
| Oxidized polyethylene wax lubricant | 0.6 | 0.8 | 0.8 | 0.8 | 0.8 | 0.8 | 0.8 |
| Irgazin Yellow | 0.015 | 0.015 | 0.015 | 0.015 | 0.015 | 0.015 | 0.015 |
| 0.55 micron D50 zeolite A | 2 | 2 | | 2 | 2 | | 0.8 |
| Zeolite A | | | 2 | | | 2 | |
| 6-amino-1,3-dimethyluracil | 0.25 | 0.25 | 0.25 | 0.25 | 0.25 | 0.25 | 0.25 |
| TiO2 | 4 | 4 | 4 | 4 | 4 | 4 | 4 |
| Physical properties | | | | | | | |
| Tensile strength at yield (psi) | 7683 | 7556 | 7574 | 7452 | 7300 | 7596 | 7634 |
| Tensile Modulus (kpsi) | 392.8 | 384.5 | 389.5 | 384 | 379 | 389.4 | 399.1 |
| Notch Izod (ft-lbs/in) | 6.5 | 6.8 | 2.6 | 9.2 | 8.2 | 3.3 | 2.6 |
| Drop dart impact (ft-lbs) | 28 | 28 | 14.5 | 30 | 29 | 28 | |
| Vise crush | pass | pass | pass | pass | pass | pass | |
| HDT (° C., annealed) | 112.5 | 112 | 112 | 109.5 | 112 | 112 | 112.5 |

0.55 μmD50 zeolite A is made by wet milling followed by spray drying

Example 6

Pipe Extrusions for CTS 2" SDR 13.5 Pipes

CTS 2" SDR 13.5 pipes made of formulation 27 in example 5 were prepared using a conical counter-rotating twin screw extruder TC-55 with barrel temperatures set at: 360-370° F., die temperatures set at 380-420° F. and screw oil at 360° F. with screws at 38 rpm. The feeds were run at 400-450 lbs/hr. The resultant pipe had a dart impact of 88.8 ft–lb and was free of moisture issues.

Example 7

Fitting Formulations for Injection Molding

The formulations in the table below were melt processed on a mill at 400° F. and cubed into pellets. Pellets are dried in a desiccant dryer at 190° F. for 4 hours before molding using a Vandorn HT-85 injection molding machine. Specimens for physical property measurement were injection molded with satisfaction for finishing and color. It is worth noting that sub-micron milled zeolite improved the impact property as compared to commercially available Zeocros CA-150. Molded products met cell class 23447.

| PARTS | 32 | 33 | 34 | 35 | 36 |
|---|---|---|---|---|---|
| 64.5Cl % CPVC | 100 | 100 | 100 | | |
| 1.2 NaC10 65.25Cl % CPVC | | | | 101.2 | |
| 65.75Cl % CPVC | | | | | 100 |
| 6-amino-1,3-dimethyluracil | 0.25 | 0.25 | 0.25 | 0.25 | 0.25 |
| Disodium Sebacate | | 1.25 | | | |
| Zeolite CA-150 | | | 2.5 | | |
| 0.55D50 zeolite | 2.5 | 1.25 | | 1.3 | 2.5 |
| MBS Impact Modifier | 8 | 7.75 | 8 | 8 | 8 |
| Antioxidant | 0.25 | 0.25 | 0.25 | 0.25 | 0.25 |
| TiO2 | 3.5 | 3.5 | 3.5 | 3.5 | 3.5 |
| Fisher Tropsch wax lubricant | 1.3 | 1.15 | 1.15 | 1.15 | 1.15 |
| Oxidized polyethylene wax lubricant | 1.2 | 1.2 | 1.2 | 1.2 | 1.2 |
| Irgazin Yellow | 0.01 | 0.01 | 0.01 | 0.01 | 0.01 |
| Physical properties | | | | | |
| Tensile strength at yield (psi) | 7370 | 7461 | 7208 | 7868 | 7704 |
| Tensile Modulus (kpsi) | 381 | 401 | 385 | 404 | 399 |
| Notched Izod (ft-lb/in) | 3.02 | 2.53 | 2.02 | 1.99 | 2.9 |
| HDT (° C.) (annealed) | 105 | 104 | 105 | 106.5 | 109 |
| MFI (215° C., 21.6 kgs) | 12 | 13.1 | 11.9 | 7 | 7.3 |

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A rigid chlorinated polyvinyl chloride (CPVC) composition comprising (a) a CPVC resin, and (b) a stabilizer system consisting of 1) a non-metal containing stabilizer based on organic chemistry, and 2) from 0.1 to 3.0 part by weight zeolite per 100 parts by weight of said CPVC resin, and optionally 3) a $C_6$ to $C_{12}$ metal carboxylate.

2. The rigid CPVC composition of claim 1 wherein the CPVC resin has from about 64 to about 67 weight % chlorine.

3. The rigid composition of claim 1, wherein said stabilizer system is present in an amount of from about 0.1 to about 6.0 parts by weight per 100 parts by weight of said CPVC resin.

4. The rigid composition of claim 1, wherein said organic based stabilizer is present in an amount of from about 0.1 to about 2.0 parts by weight per 100 parts by weight of said CPVC resin.

5. The rigid composition of claim 1, wherein the zeolite has sub-micron particle size.

6. The rigid composition of claim 1, wherein at least one $C_6$ to $C_{12}$ metal carboxylate is present from about 0.1 to about 3.0 parts by weight per 100 parts by weight of said CPVC resin.

7. The rigid CPVC composition of claim 1, wherein the weight ratio of zeolite to $C_6$ to $C_{12}$ metal carboxylate is between about 6:1 to 1:6.

8. The rigid composition of claim 1, wherein the organic based stabilizer is a uracil derivative.

9. The rigid composition of claim 1, wherein the organic based stabilizer is 6-amino-1,3-dimethyluracil.

10. The rigid composition of claim 1, wherein the carboxylate of said $C_6$ to $C_{12}$ metal carboxylate is at least one of suberate, azelate, sebacate, and undecanedioate.

11. The rigid composition of claim 1, wherein the $C_6$ to $C_{12}$ metal carboxylate is disodium sebacate.

12. A pipe comprising a rigid CPVC composition according to claim 1.

13. A method of stabilizing a halogenated polymer composition comprising employing in the composition a stabilizer system consisting of 1) a non-metal containing stabilizer based on organic chemistry, and 2) from 0.1 to 3.0 parts by weight zeolite per 100 parts by weight of said CPVC resin, and optionally 3) a $C_6$ to $C_{12}$ metal carboxylate.

* * * * *